(12) United States Patent
Hergault et al.

(10) Patent No.: US 9,224,417 B2
(45) Date of Patent: Dec. 29, 2015

(54) CASING FOR RECEIVING AN EXTRACTIBLE HARD DRIVE AND INCLUDING A ROCKING CAM FOR EXTRACTING SAID HARD DRIVE

(75) Inventors: Stéphane Hergault, Rueil Malmaison (FR); Grégory Sonjon, Rueil Malmaison (FR); Dominique Susini, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 346 days.

(21) Appl. No.: 13/515,802

(22) PCT Filed: Nov. 9, 2010

(86) PCT No.: PCT/EP2010/006800
§ 371 (c)(1),
(2), (4) Date: Jun. 13, 2012

(87) PCT Pub. No.: WO2011/076313
PCT Pub. Date: Jun. 30, 2011

(65) Prior Publication Data
US 2012/0248951 A1    Oct. 4, 2012

(30) Foreign Application Priority Data
Dec. 21, 2009 (FR) ................................... 09 06196

(51) Int. Cl.
*G11B 15/675* (2006.01)
*G11B 17/043* (2006.01)
*G11B 33/12* (2006.01)

(52) U.S. Cl.
CPC .......... *G11B 15/6751* (2013.01); *G11B 17/043* (2013.01); *G11B 33/124* (2013.01)

(58) Field of Classification Search
CPC .... G06K 13/08; G06K 13/0806; G06F 1/187; G11B 15/6751; G11B 17/043; G11B 33/124
USPC ............. 361/679.3, 679.37–679.39; 439/159, 439/160; 312/223.1, 223.2
See application file for complete search history.

(56) References Cited

U.S. PATENT DOCUMENTS

| 4,623,945 | A | | 11/1986 | Deutsch et al. | |
|---|---|---|---|---|---|
| 4,890,276 | A | * | 12/1989 | Ono | G11B 17/043 369/194 |
| 5,149,276 | A | * | 9/1992 | Dixon | 439/159 |

(Continued)

FOREIGN PATENT DOCUMENTS

FR    2 433 220 A1    3/1980

*Primary Examiner* — Daniel J Troy
*Assistant Examiner* — Hiwot Tefera
(74) *Attorney, Agent, or Firm* — Muncy, Geissler, Olds & Lowe, P.C.

(57) ABSTRACT

A casing is provided which includes a housing for receiving an extractable element and an extractor member mounted in the vicinity of the housing. The extractor member includes a tilting cam having a bearing end extending into the housing and an actuation end co-operating with a slidable lever having a drivable first end and a second end provided with a recess having the actuation end of the cam passing therethrough. The actuation end of the tilting cam includes a rear edge provided with an indentation and resilient return means holding said rear edge pressed against a rear end of the recess so that the rear end of the recess drops into the indentation at the end of insertion of the extractable element.

8 Claims, 3 Drawing Sheets

(56) References Cited

U.S. PATENT DOCUMENTS

| | | | |
|---|---|---|---|
| 5,507,658 A * | 4/1996 | Ho | 439/159 |
| 5,836,775 A * | 11/1998 | Hiyama et al. | 439/159 |
| 5,841,752 A * | 11/1998 | Ohmori | G11B 11/10558 |
| | | | 360/99.07 |
| 6,017,230 A * | 1/2000 | Yao | 439/159 |
| 6,071,133 A * | 6/2000 | Ho et al. | 439/159 |
| 6,200,148 B1 * | 3/2001 | Yu | 439/159 |
| 6,234,813 B1 * | 5/2001 | Hanyu | 439/159 |
| 6,290,136 B1 * | 9/2001 | Koseki et al. | 235/475 |
| 6,439,904 B1 * | 8/2002 | Hu et al. | 439/159 |
| 6,966,786 B1 * | 11/2005 | Motojima et al. | 439/159 |
| 6,986,675 B2 * | 1/2006 | Takada | 439/159 |
| 6,993,778 B2 * | 1/2006 | Kanada | G11B 17/051 |
| | | | 720/638 |
| 7,090,513 B2 * | 8/2006 | Kuo | 439/92 |
| 7,179,104 B2 * | 2/2007 | Wada et al. | 439/159 |
| 7,189,087 B2 * | 3/2007 | Taguchi | 439/159 |
| 7,534,116 B2 * | 5/2009 | Ho | 439/159 |
| 7,618,272 B2 * | 11/2009 | Cheng | 439/159 |
| 7,766,678 B1 * | 8/2010 | Abe | 439/159 |
| 2001/0008813 A1 * | 7/2001 | Nishioka | 439/159 |
| 2002/0160639 A1 * | 10/2002 | Ezaki | 439/160 |
| 2003/0011928 A1 * | 1/2003 | Yanase | G11B 17/0405 |
| | | | 360/99.06 |
| 2005/0287855 A1 * | 12/2005 | Taguchi | 439/159 |
| 2006/0056103 A1 * | 3/2006 | Hamming | 360/97.01 |
| 2006/0223352 A1 * | 10/2006 | Wada et al. | 439/159 |
| 2008/0280468 A1 * | 11/2008 | Ting | 439/160 |
| 2010/0099284 A1 * | 4/2010 | Sambhandam Palani et al. | 439/159 |

* cited by examiner

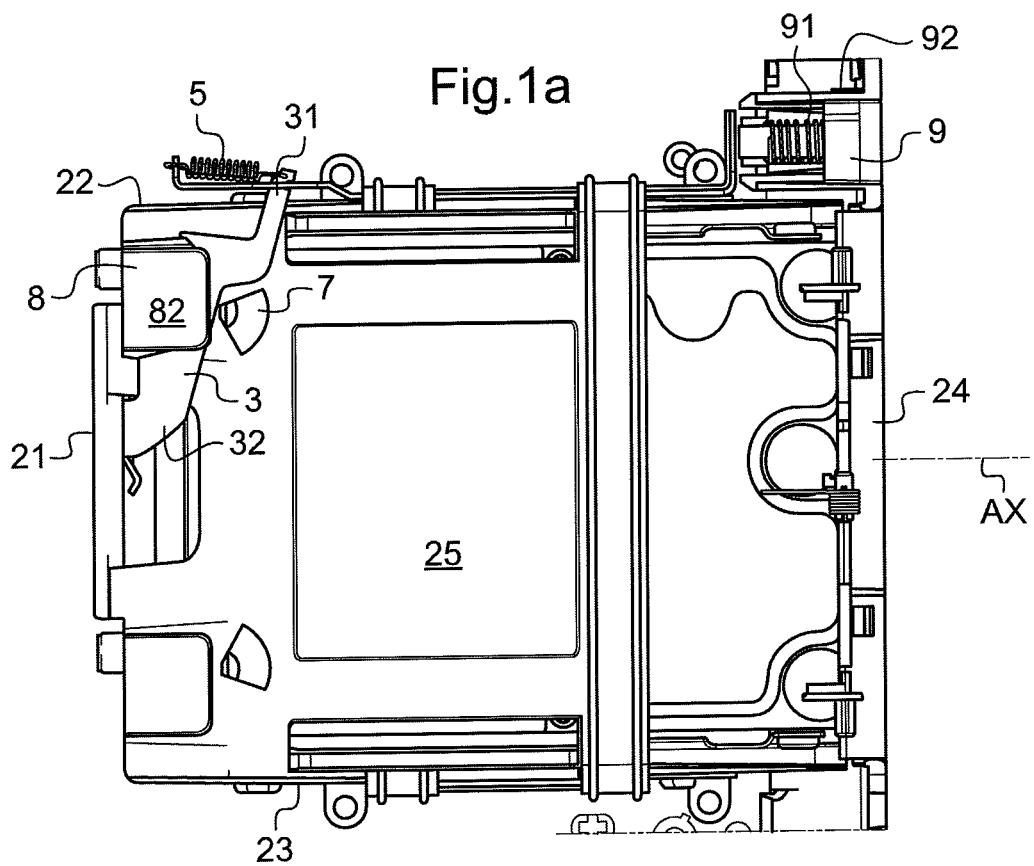
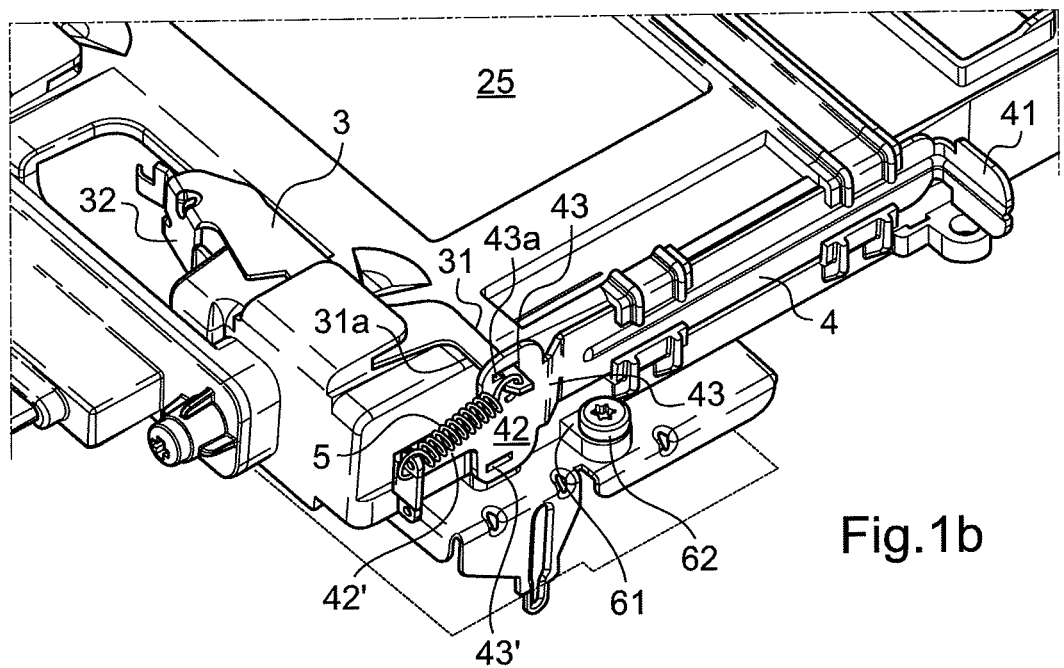

CASING FOR RECEIVING AN EXTRACTIBLE HARD DRIVE AND INCLUDING A ROCKING CAM FOR EXTRACTING SAID HARD DRIVE

BACKGROUND OF THE INVENTION

1. Field of the Invention

The invention relates to a casing for receiving an extractable element such as an extractable hard disk, the casing having a housing that is open to the outside and in which the extractable hard disk is engaged, and also having a movable member that can be actuated to extract in part a disk that is engaged in this housing of the casing so as to enable a user to take hold of the front portion of the hard disk in order to extract it completely.

2. Brief Discussion of the Related Art

In practice, an internal electronic connector is situated at the back of the housing when the assembly is mounted, e.g. on a printed circuit. When a user engages a hard disk in the casing, the user exerts pressure on the front portion of the disk so that a complementary connector situated on the rear portion of the hard disk engages in the internal connector situated at the end of the housing.

Thus, once the hard disk is in place inside the casing, the connectors are fully engaged one in the other, such that the extractable hard disk is operational and can be taken in charge by the operating system associated with the printed circuit of the casing.

Given the mutual engagement required of the connectors when the hard disk is in place, it is necessary to exert a pressure force from the rear of the casing and against the hard disk in order to separate the connectors from each other and thus initiate extraction of the hard disk.

This force may be provided by means of a cam mounted to tilt on the casing and having an ejector end that comes to bear against the end of the hard disk when the cam is actuated. The force exerted by the ejector end enables the connectors to be separated and enables the hard disk to be extracted in part so as to allow the user to take hold of its front portion, which then projects out from the front face of the casing.

In practice, such a casing which is generally of rectangular block shape is generally made of pieces of sheet metal that are cut out, stamped, folded, and connected to one another, although it is also possible for at least some of the components of the casing to be based on optionally-reinforced plastics material.

When designing such casings, ever greater account is being taken of the concept of ergonomics and comfort in use. The final user appreciates being in a position to know that the extractable element has been properly inserted or indeed to have an agreeable sensation on inserting or extracting the extractable element.

SUMMARY OF THE INVENTION

The object of the invention is to provide a casing of the above type that has an improved interface with the user.

The invention provides a casing including a housing for receiving an extractable element and an extractor member mounted in the vicinity of the housing. The extractor member comprises a tilting cam having a bearing end extending into the housing and an actuation end co-operating with a slidable lever having a drivable first end and a second end provided with a recess having the actuation end of the cam passing therethrough, the actuation end of the tilting cam including a rear edge provided with an indentation and resilient return means holding said rear edge pressed against a rear end of the recess so that the rear end of the recess drops into the indentation at the end of insertion of the extractable element, thereby emitting a sound.

The cam is advantageously designed in such a manner as to enable the extractable element to be ejected and to accompany insertion by tilting about its central portion.

The first end of the lever advantageously forms a pushbutton that projects from the front face of the casing body. The actuator end of the lever serves to enable the cam to be tilted by pushing in the pushbutton-forming end when ejecting the extractable element.

With the presence of the indentation that co-operates with the resilient return means, the operation of inserting the extractable element becomes more comfortable in use. When the user inserts the extractable element into the casing, at the end of the stroke of the element the user can feel the lever "dropping" into the indentation provided in the cam. This sensation is acoustic in that the lever strikes the bottom of the indentation and produces a perceptible click noise, in particular when these two parts are made of metal. However the sensation may be associated with or replaced with a tactile sensation, since on being pushed towards the indentation in the cam by the resilient return means, the lever can also give rise to vibration that propagates the lever and the casing so as to be felt by the user. The user thus knows that the hard disk has been properly inserted.

By way of example, the resilient return means comprise a return spring having one end linked to the actuation end portion of the cam that passes through the recess in the lever, and having its other end linked to the second end of the lever beyond and at a distance from the recess in said lever. It is thus active in traction while the extractable element is being inserted. (It is also possible to envisage a mode of operation in compression during insertion of the extractable element, in which case it is appropriate to make provision for fastening the end of the spring in a different zone of the lever.)

While the pushbutton-forming end of the lever is being pushed in, the spring stretches, the cam tilts, and the lever escapes from the indentation in the cam.

When the user inserts an extractable element into the casing, the return spring serves to transmit torque to the cam, thereby giving the user a sensation of resistance; the user then exerts a force on the cam via the rear face of the extractable element that the user is pushing into the casing, which force opposes the force exerted by the return spring on the cam. When the user pushes the pushbutton at the end of the lever in order to eject the extractable element, the return spring then serves to transmit a torque to the lever, thereby facilitating the tilting movement of the cam that serves to eject the element, thereby assisting the user.

Also preferably, the casing body may comprise a projecting element against which the lever comes into abutment during tilting of the cam towards an extractable element inserted state. When the lever strikes thereagainst, it produces a noise, which is in addition to the noise caused by the lever engaging in the indentation in the cam, thereby obtaining a noise that is more perceptible and/or giving rise to more vibration in the casing, which vibration can be felt by the user. The casing thus forms a resonating chamber.

By way of example, the projecting element of the casing body may be a projection forming an integral portion of the casing body, or it may be a casing mounting element of the screw type inserted in a screw-receiving socket that is present in the casing body.

In a variant, the lever presents symmetry about a longitudinal plane, thereby enabling it to be mounted equally well along one side edge of the casing body or along its opposite edge. Provision can thus be made for the lever to have two recesses, only one of which is used depending on the side of the casing along which the lever is mounted. It is also possible to propose a lever shape that has a single recess, but that presents an end forming a pushbutton-function that is for example T-shaped. This symmetry in the shape of the lever is a characteristic that is advantageous since it enables the position of the lever pushbutton to be adapted to match various constraints concerning style, ergonomics, etc. On these lines, it is advantageous for the casing body to include elements for guiding the lever that enable the lever to be mounted slidably either along one side face of the casing body, or else along another side face of the casing body (in particular a side face opposite from the preceding face). There is thus only one type of casing that needs to be fabricated, and that can then be adapted during the final stage of assembly by positioning the lever on one or other of its sides.

Furthermore, provision may be advantageously be made for the casing body to include a tab at the rear portion of its top face, which tab includes a base extended by a tongue that extends parallel to said top face while being spaced apart from said top face, together with a lug projecting from the top face and situated facing a free end of the tongue. The tilting cam is then secured to the casing body by snap-fastening, having its central portion engaged both between the tongue and the top face of the casing body and also between the lug and the base.

With this system for mounting the cam, there is no need to provide a stationary pin that is rigidly secured to the casing body. The casing body may be made out of molded plastics material so as to include the tab and the lug in the rear portion of its top face. It may also be made out of cut and stamped sheet metal, in which case the tab is formed by cutting out a U-shape that is subsequently stamped to extend parallel to the top face of the casing while being spaced apart therefrom, with the lug being obtained in analogous manner. The lug may have a face that faces in the opposite direction to the free end of the tongue and that is inclined relative to the top face of the casing body so as to constitute a ramp that facilitates engaging the cam between the tongue and the front face.

In a particular embodiment, the casing includes a pushbutton mounted in an enclosure formed in the casing to slide between a rest position and a pushed-in position of the lever in such a manner that the lever strikes against the pushbutton when the rear end of the recess drops into the indentation.

Provision may also be made to adopt this type of cam mounting with a cam that does not have the indentation and/or the return spring as described above.

BRIEF DESCRIPTION OF THE DRAWINGS

Other characteristics and advantages of the invention appear more clearly in the light of the following description and the accompanying drawings relating to a non-limiting embodiment of the invention comprising a casing for an extractable hard disk.

Reference is made to the figures of the accompanying drawings, in which:

FIGS. 1a and 1b are diagrammatic views, respectively a plan view and a perspective view, showing the bottom face of the body of the casing of the invention, fitted with the cam and the lever enabling the removable hard disk to be inserted and ejected;

DETAILED DESCRIPTION OF THE PREFERRED EMBODIMENTS

Figure 2:
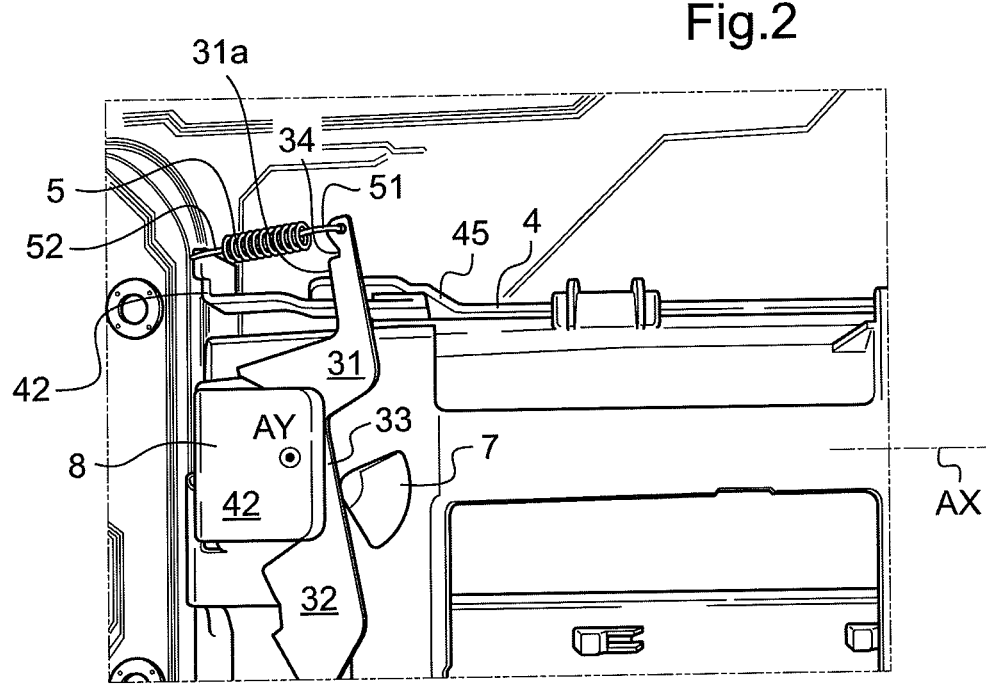
FIG. 2 is an enlarged portion of FIG. 1 in the connection zone between the cam and the lever, the cam being in the process of being tilted corresponding to a state of ejecting the removable hard disk.

FIGS. 1a and 1b show a casing 1 of the invention comprising a casing body 2 of plastics material that is obtained by molding and that is fitted with a tilting cam 3 and an actuator lever 4.

The same components retain the same references from one figure to another.

The casing body 2, which is generally in the form of a rectangular block, has a perforated top wall or face (not shown so as to reveal the components inside the casing), a bottom wall or face 25 that is likewise perforated, two side walls or faces 22, 23, namely a right face and a left face, together with a front face 21 that presents a slot for inserting an extractable element (not shown), here an extractable hard disk, and a rear wall or face 24.

Inserting the hard disk, which is likewise generally in the form of a rectangular block, into the casing 1 thus consists in placing it in register with the insertion slot in the front face 21 of the casing body 2, and in causing it to slide into the casing 1 along the longitudinal direction AX of the casing, until it comes to bear against the rear wall 24 of the casing body.

Specifically, an electronic connector (not shown in the figures) having branches oriented in the direction AX (FIG. 1b) is situated at the rear wall 24 in order to receive the pins of a corresponding connector fitted to the extractable hard disk, these pins being received when the disk is fully inserted into the casing 1.

In practice, engaging the pins of the hard disk connector in the corresponding pins situated at the rear wall 24 suffices to ensure that the hard disk is held in the casing. The hard disk is extracted by exerting a thrust force directed along the direction AX towards the front face 21 against the rear face of the extractable hard disk.

This thrust force is exerted by the tilting cam 3 that is situated in the rear portion of the casing 1 and that has an ejector end 32 that bears against the rear face 24 of the extractable hard disk when the cam 3 is tilted.

In this example the tilting cam 3 is made of cut sheet metal, being generally in the shape of an arm or the like, and it presents both an actuation end 31 of pointed shape whereby it can be actuated to tilt, and the above-mentioned ejector end 32 whereby it exerts thrust on the extractable hard disk in order to eject it on tilting.

Figure 3:
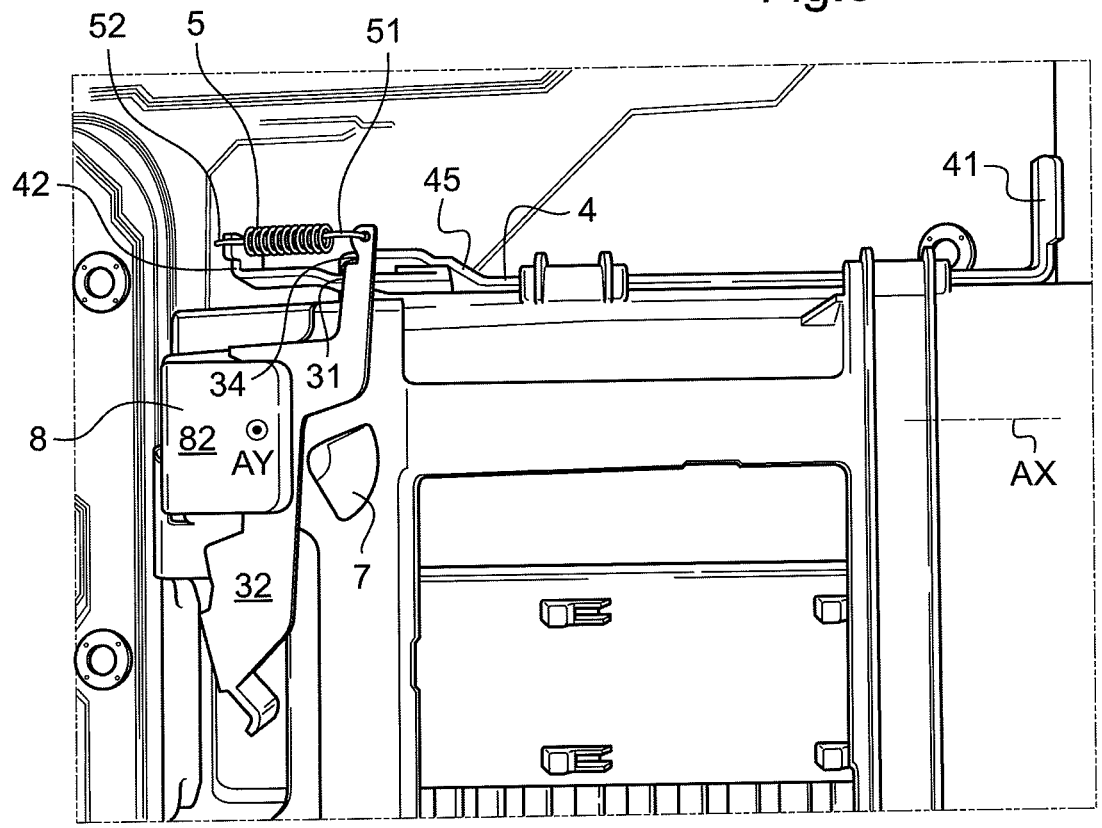
FIG. 3 is the same view as FIG. 2, the cam this time being in a position corresponding to a state in which the removable hard disk is inserted inside the casing.
Figure 4:
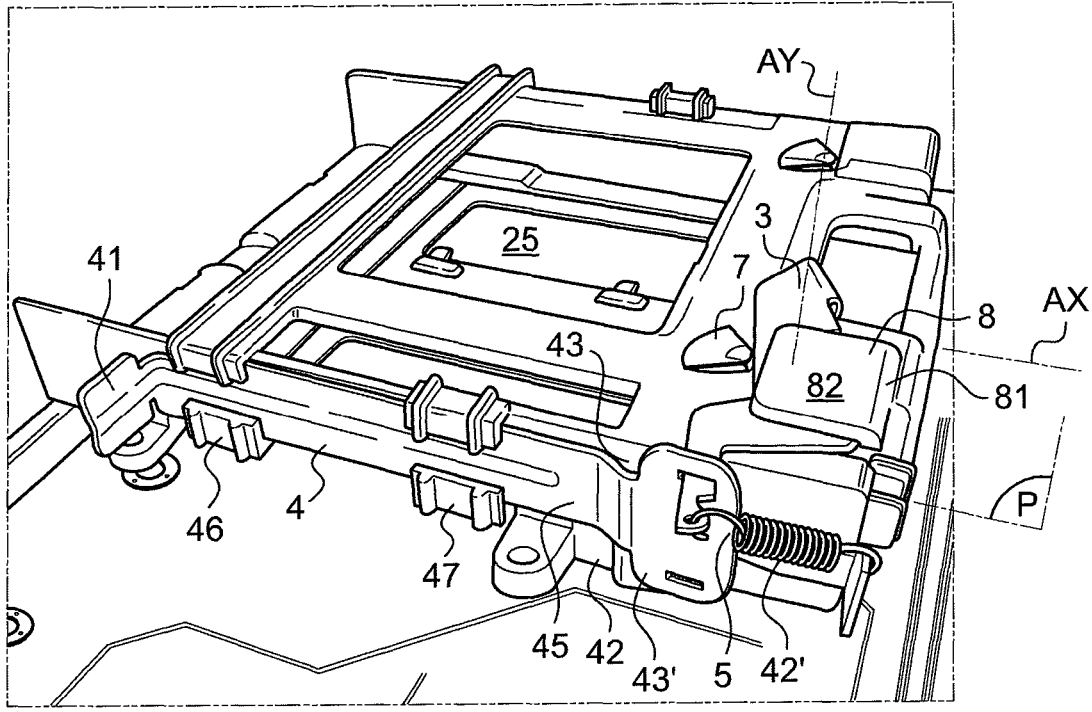
FIG. 4 is a perspective view of the body of the casing in which the cam is in the process of being tilted corresponding to a state of ejecting the removable hard disk, as in FIG. 2.
Figure 5:
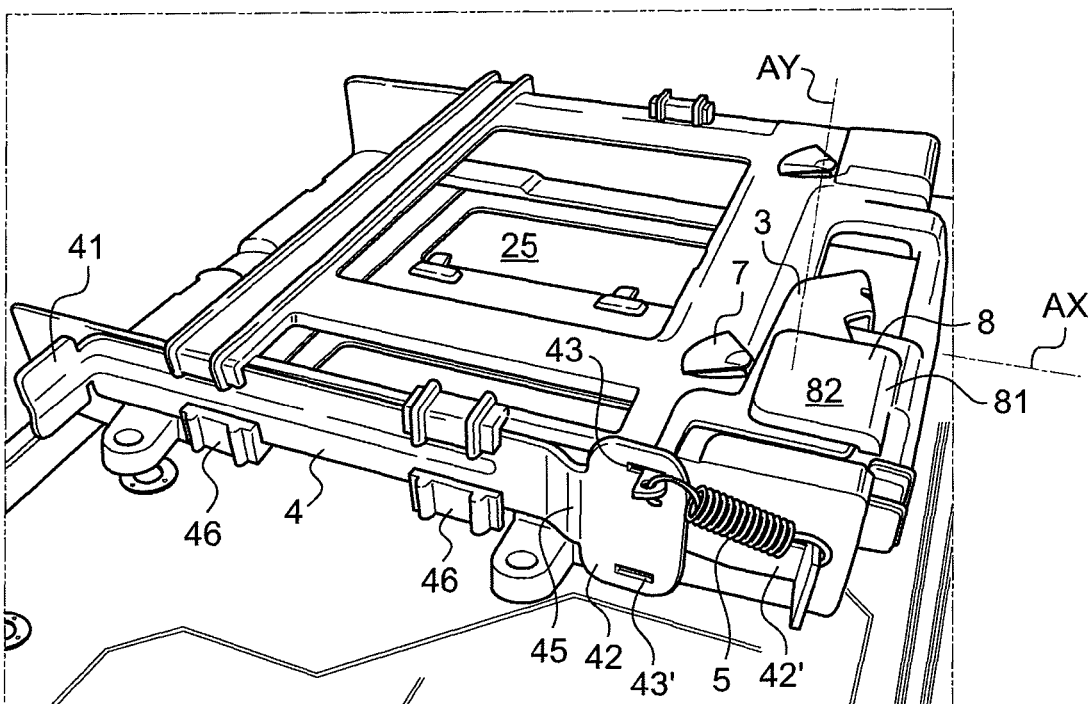
FIG. 5 is the same perspective view as FIG. 4, the cam this time being in a position corresponding to a state in which the removable hard disk is inserted in the casing, as in FIG. 3.

The cam 3 has a central portion 33 situated between its ends 31 and 32 and about which the cam tilts between a rest position when the hard disk is inserted (as shown in FIGS. 3 and 5) and a tilted position when the hard disk is ejected (as shown in FIGS. 2 and 4). In FIGS. 2 to 5, an axis AY is shown symbolically that extends perpendicularly to the top face of the casing body 2, passing through the central portion 33 of the cam 3, and about which the cam pivots when it is actuated.

The cam 3 is secured to the casing body 2 by a tab 8 and a lug 7, while being suitable for pivoting relative thereto. The tab 8 comprises a base 81 that extends perpendicularly to the top face extending the rear wall 24, and that is itself extended by a generally plane tongue 82. The tongue 82 extends parallel to the top face while being spaced apart from said face by a distance that corresponds substantially to the thickness of the sheet metal constituting the cam 3 in its central portion 31.

The lug 7 projects from the top face and is situated facing the free end of the tongue 82. It is of a height that corresponds substantially to the distance between the tongue 82 and the top face, and it is spaced apart from the free end of the tongue 82.

The cam 3 is assembled to the rear portion of the casing body 2 merely by snap-fastening. The edge of the central portion 31 of the cam 3 is then engaged between the free end of the tongue 82 and the top face of the casing body 2, this central portion 33 then having its bottom face pressing against the free end of the lug 7. A force is then exerted on the cam 3 in the direction AX in order to move the central portion 33 of the cam 3 closer to the base 81 of the tab 8.

Under the effect of this snap-fastening force applied to the cam 3, the tongue 82 flexes to open by moving away from the top face, thereby enabling the cam to advance towards the base 81, while having its bottom face pressing against the lug 7. At the end of this movement, the central portion 33 of the cam is received pressed against the top face, while the opposite edge of this central portion 33 comes up to the lug 7 and slides along the lug towards the top face under the effect of the bending forces applied by the tongue 82 on said central portion 33.

At this stage, the cam 3 is completely snap-fastened in its housing, i.e. mounting of the cam is substantially completed: it is bearing via its bottom face against the top face of the casing body, and the bottom face of the tongue 82 is bearing against the top face of the cam.

In addition, the cam 3 is also prevented from moving longitudinally, i.e. in the direction AX, firstly by the base 81 of the tab 8 that constitutes an abutment against the edge of the central portion 33 of the cam 3, and secondly by the lug 7 that constitutes an abutment against the opposite edge of the central portion 33.

The cam 3 thus has its central portion 33 that is held parallel to the top face of the casing 1, and it is suitable for pivoting about its central portion 17. The ejector end 32 of the cam 3 is a portion that is folded relative to the central portion 33, and that is engaged in a recess extending in the central portion of the rear wall 24 and of the rear portion of the top face of the casing body 2. This recess presents dimensions that are greater than the dimensions of the ejector end 32 in order to leave it free to move and come to bear against the rear face of an extractable hard disk engaged in the casing 1.

The hard disk is ejected by exerting a force along the axis AX towards the rear face 24 on the actuation end 31 of the cam 3 so as to cause the cam 3 to tilt and thus exert a force against the rear face of the extractable disk via the ejector end 31 and towards the front face 21.

The actuation end 31 of the cam is moved by means of the lever 4, which is mounted to slide along the slide wall 22 and which includes an actuator end 42 situated at the actuation end 31 of the cam 3, and an opposite end 41 that forms a pushbutton that is situated close to the front face 21 of the casing 1.

The lever 4 is constituted by a generally rectangular piece of sheet metal that is cut and stamped or folded, and it slides along the side wall 22 of the casing 1 while extending parallel to the axis AX. This slider-forming lever 4 is secured to the casing body 2 by two curved top tabs 44, 45 that hold its top edge, and by two curved bottom tabs 46, 47 that hold its top and bottom edges like jaws so as to press the entire lever 4 against the outside face of the side wall 22.

As shown more particularly in FIGS. 4 and 5, the actuator end 42 of the lever 4 has two recesses, a top recess 43 and a bottom recess 43'. When the lever 4 is mounted on the side wall 22, the actuation end 31 of the cam 3 is engaged in the top recess 43 so as to be drivingly linked to the lever. Naturally, when it is desired to mount the lever on the opposite side wall 23 of the casing 1, it is turned the other way up since it presents symmetry about a longitudinal plane P (FIG. 4), and then the cam as appropriately modified is engaged in the recess 43' which becomes the top recess in this configuration.

Furthermore, the cam 3 presents an indentation 34 that is visible more particularly in FIGS. 2 and 3 in the vicinity of its actuation end 31: in the rest position (FIG. 3) the zone of the lever 4 that includes the recess 43 is engaged in the indentation 34, and in the ejection position (FIGS. 1b and 4) the indentation 34 is offset along the actuation portion 31 of the cam 3 that passes through the recess 43 in the lever 4.

The figures also show a return spring 5 having one end 51 connected to the portion of the actuation end 31 of the cam that passes through the recess 43, regardless of the position (rest or ejection) of the cam 3, and having its other end linked to the actuator end 42 of the lever 4, in a portion 42' that extends beyond the recess 34, and at a distance therefrom that is sufficient to ensure that the spring 5 can be properly installed and tensioned between the lever 4 and the cam 3. In FIGS. 3 and 5, it can be seen that the spring 5 is tensioned when the cam 3 is at rest, and in FIGS. 2 and 4 it can be seen that it is less tensioned when the cam 3 is in the ejection position.

Finally, as shown in FIG. 1b, the casing body 2 includes on its bottom wall a screw-fastening socket in which a screw 62 is designed to be engaged through the top wall of the casing 1 for fastening it to the remainder of the casing. This metal screw 62 is arranged in such a manner that the lever 4, close to its actuator end 42, touches the screw 62 when it slides towards the front face 21 of the casing, while the hard disk is being inserted. This is made possible by the profile of the lever 4 that presents a sloping flank 45 connecting the middle portion of the lever 4 to its actuator end 42, which flank strikes against the screw 62. Instead of having a screw, it would be possible to design the casing so that it presents a projection 61 that performs the same role relative to the flank 45 of the lever 4.

In practice, when the user inserts the hard disk through the front slot of the casing 2, the hard disk pushes back the ejector end 32 of the cam 3, thereby entraining the end 42 of the lever in a movement towards the front face 21 of the casing. During this relative movement between the cam and the lever, the spring 5 pulls the lever 4 into the indentation 34 of the cam: the rear edge of the cam 31a is held continuously by the spring 5 against the rear end 43a of the recess 43 in the lever, until it "drops" into the indentation 34, thereby creating a small characteristic click noise informing the user that the hard disk has been inserted properly (FIGS. 3 and 5). This click noise is reinforced by the noise that results from the flank 45 of the lever 4 simultaneously striking the screw 62.

It should also be observed that a button 9 is mounted in the enclosure 92 of the casing body 2 in order to slide between a pushed-in extraction position and an abutment position flush with the outside surface of the casing (the position shown in FIG. 1a). The button 9 is associated with a return spring 91 mounted between the bottom of the enclosure 92 and the head of the button 9 in order to urge the button 9 towards its abutment position. In the pushed-in position, the button 9 has a portion passing through the bottom of the enclosure 92 and pushing back the lever so as to cause the cam to tilt into the extraction position. At the end of insertion, when the cam tilts in the other direction and pushes back the lever and when the rear end of the recess drops into the indentation, the pusher 41 strikes the button 9 in its abutment position, thereby amplifying the noise by a redundancy effect.

When the user ejects the hard disk, the user applies force to the end 41 of the lever 4 that forms a pushbutton, thereby pushing the lever 4 towards the rear wall 24 of the casing 2 and causing the cam 3 to tilt towards a position as shown in FIGS. 2 and 4: the lever passes "over" the indentation 34 in the cam 3, and the return spring 5 becomes tensioned, transmitting torque to the lever 4, urging it towards the cam 3, and thus making it easier to eject the hard disk by facilitating the ejection movement of the cam 3.

In addition, another return spring may be provided that is not shown and optional: it acts continuously to urge the lever 4 towards its rest position, which corresponds to the position that it occupies in FIGS. 3 and 5, in which position the cam 3 is not tilted.

It should be observed that it is possible within the ambit of the invention to provide equivalent mechanical links between the lever 4 and the cam 3 that are of types other than those described above with the indentation 34 present on the cam and into which the end of the lever 4 becomes engaged. It is thus possible to have a pivoting link using a shaft passing through the two parts. It is also possible to envisage that it is the end of the lever 4 that becomes inserted in a recess formed in the cam 3.

What is claimed is:

1. A casing including a housing for receiving an extractable element and an extractor member mounted in the vicinity of the housing, wherein the extractor member comprises a tilting cam having a bearing end extending into the housing and an actuation end co-operating with a slidable lever having a drivable first end and a second end provided with a recess having the actuation end of the cam passing therethrough, the actuation end of the tilting cam including a rear edge provided with an indentation having a depth extending along a sliding direction of the lever, and resilient return means holding said rear edge pressed against a rear end of the recess so that the rear end of the recess drops into the indentation at the end of insertion of the extractable element, thereby emitting a sound, wherein the resilient return means is configured to urge the tilting cam to eject the extractable element.

2. The casing according to claim 1, wherein the resilient return means comprise a return spring having one end linked to the actuation end portion of the cam that passes through the recess in the lever, and having its other end linked to the second end of the lever beyond and at a distance from the recess in said lever.

3. The casing according to claim 1, including a projecting element against which the lever comes into abutment while the cam is tilting towards an extractable element inserted state.

4. The casing according to claim 3, wherein the projecting element of the casing is a projection forming an integral portion of said casing, or is a casing assembly element of the type comprising a screw inserted in a screw-receiving socket present in the casing.

5. The casing according to claim 1, wherein the lever presents symmetry about a longitudinal plane.

6. The casing according to claim 1, including a tab at the rear portion of a top face of the casing, said tab including a base extended by a tongue that extends parallel to said top face while being spaced apart from said top face, together with a lug projecting from the top face and situated facing a free end of the tongue, the tilting cam being secured to the casing by snap-fastening, having its central portion engaged both between the tongue and the top face of the casing and also between the lug and the base.

7. The casing according to claim 1, including guide elements for guiding a lever, enabling the lever to be mounted slidably either along one side of the housing, or along another side of the housing.

8. The casing according to claim 1, including a pushbutton mounted in an enclosure formed in the casing to slide between a rest position and a pushed-in position of the lever in such a manner that the lever strikes against the pushbutton when the rear end of the recess drops into the indentation.

* * * * *